United States Patent

[11] 3,585,474

| [72] | Inventors | Kazutsugu Kobayashi;<br>Hisayuki Matsumoto; Yoshiaki Igarashi, all of Osaka, Japan |
|---|---|---|
| [21] | Appl. No. | 803,218 |
| [22] | Filed | Feb. 28, 1969 |
| [45] | Patented | June 15, 1971 |
| [73] | Assignee | Matsushita Electric Industrial Co., Ltd.<br>Osaka, Japan |
| [32] | Priority | Feb. 29, 1968 |
| [33] | | Japan |
| [31] | | 43/13741 |

[54] ELECTRONIC COMMUTATING SYSTEM AND ELECTRONICALLY COMMUTATED MOTOR
5 Claims, 10 Drawing Figs.

[52] U.S. Cl. .................................................. 318/254, 318/138
[51] Int. Cl. .................................................. H02k 29/00
[50] Field of Search .......................................... 340/271; 313/133, 254

[56] References Cited

UNITED STATES PATENTS

| 2,980,839 | 4/1961 | Haeussermann | 318/254 X |
| 3,242,404 | 3/1966 | Favre | 318/254 X |
| 3,242,405 | 3/1966 | Ikegami | 318/254 X |
| 3,274,471 | 9/1966 | Moczala | 318/254 X |
| 3,305,713 | 2/1967 | Ikegami | 318/138 |
| 3,339,133 | 8/1967 | Favre | 318/254 X |
| 3,346,792 | 10/1967 | Noumi | 318/138 |
| 3,453,512 | 7/1969 | Polakowski | 318/254 X |

Primary Examiner—G. R. Simmons
Attorney—Wenderoth, Lind & Ponack

ABSTRACT: An electronic commutating system and an electronically commutated motor resulting therefrom. The electronic commutating system has no deadzone and no overlap despite an imperfect position detecting signal. The transition of the commutation is carried out in a differential manner. Any fluctuation in the operating temperature and/or deviation of the supply voltage does not disturb the commutation.

The electronically commutated motor utilizing said electronic commutating system starts properly and with a very small torque ripple. The motor also has a high efficiency.

INVENTORS
KAZUTSUGU KOBAYASHI
HISAYUKI MATSUMOTO
YOSHIAKI IGARASHI

BY Wenderoth, Lind & Ponack
ATTORNEYS

ELECTRONIC COMMUTATING SYSTEM AND ELECTRONICALLY COMMUTATED MOTOR

This invention relates to improved electric motors particularly to electronically commutated motors, and more particularly to those of the position detecting type.

A motor which is compact, self-starting, which has a preselected direction of rotation, which has a smooth torque, and which is capable of operating on DC, is useful in electronic equipment for driving various movable components. Portable taperecorders, for example, require such a motor which in addition has very little torque ripple.

Up to this time many methods have been proposed relating to the commutation of electric current flowing through the armature winding, which methods utilize electronic devices such as photosensitive elements cooperating with a light source and a rotating slit, magnetic sensitive devices in combination with a permanent magnet, and an impedance commutator utilizing a saturable reactor (U.S. Pat. No. 2,797,375) or the mutual coupling of two coils (U.S. Pat. Nos. 1,971,188 and 3,091,728) all operating on relatively high frequency alternating current.

Many deficiencies of mechanically commutated motors, such as relatively short life due to the wearing of brushes and the commutator material, generation of electric, electromagnetic, and sonic noise due to the sparking and chattering between the brush and the commutator, and energy loss due to the friction between the brushes and the commutator material, are overcome by using any of the methods described above.

However, there do exist other difficulties in such brushless motors (hereinafter called electronically commutated motors). An electronically commutated motor employing photosensitive elements does not have a long life or a high efficiency because the light source usually has a relatively short life and poor efficiency of conversion of electric energy to light energy. The most prominent feature of the optical system which utilizes photosensitive elements is that it is easy to give the commutation signal an on-off characteristic, or in other words, to provide a discrete signal level for on-off operation.

A discontinuous commutating signal is necessary for high efficiency. The magnetic system and the impedance system are preferable to the optical system from the standpoint of their length of useful life, although the commutation signal obtained by those systems is not a discontinuous one.

The impedance system, which is very inexpensive as compared to the other systems, produces a commutation signal which has very poor discontinuity, especially where the system has a simple construction.

In addition to discontinuity, two important features of the commutation signal are as follows:

(i) No dead zone should exist when changing from one phase signal to another phase signal. This will prevent incorrect starting.
(ii) No overlap of one phase with another phase should exist. This will prevent small torque ripple and promote high efficiency.

These two conditions are very difficult to satisfy simultaneously with the feature of good discontinuity in a commutation signal produced in an optical system, and with the feature of poor discontinuity in a commutation signal produced in a magnetic system or an impedance system.

It is an object of the present invention to provide an improved electronically commutated motor.

It is a further object of the present invention to provide an electronically commutated motor having little torque ripple.

It is a still further object of the present invention to provide an electronically commutated motor which does not start improperly.

It is a still further object of the present invention to provide an electronically commutated motor which does not require too much precision in the manufacturing process.

It is a still further object of the present invention to provide a principle for the construction of a perfect commutating signal which can be utilized in any electronic commutating system.

The electronically commutated motor, according to the present invention, has a commutation signal with the above-mentioned important features without the disadvantages inherent in the use of the optical system, the magnetic system or the impedance system.

Briefly described, the motor according to the present invention utilizes polyphase rectification by a base-emitter circuit of a transistor. The collector current of the transistor is used directly as armature current or is used as a commutating signal to control the power transistors which control the armature current.

Other objects and advantages of the present invention will, of course, become apparent and immediately suggest themselves to those skilled in the art to which the invention is directed from a reading of the following specification in connection with the accompanying drawing in which.

Figure 1:
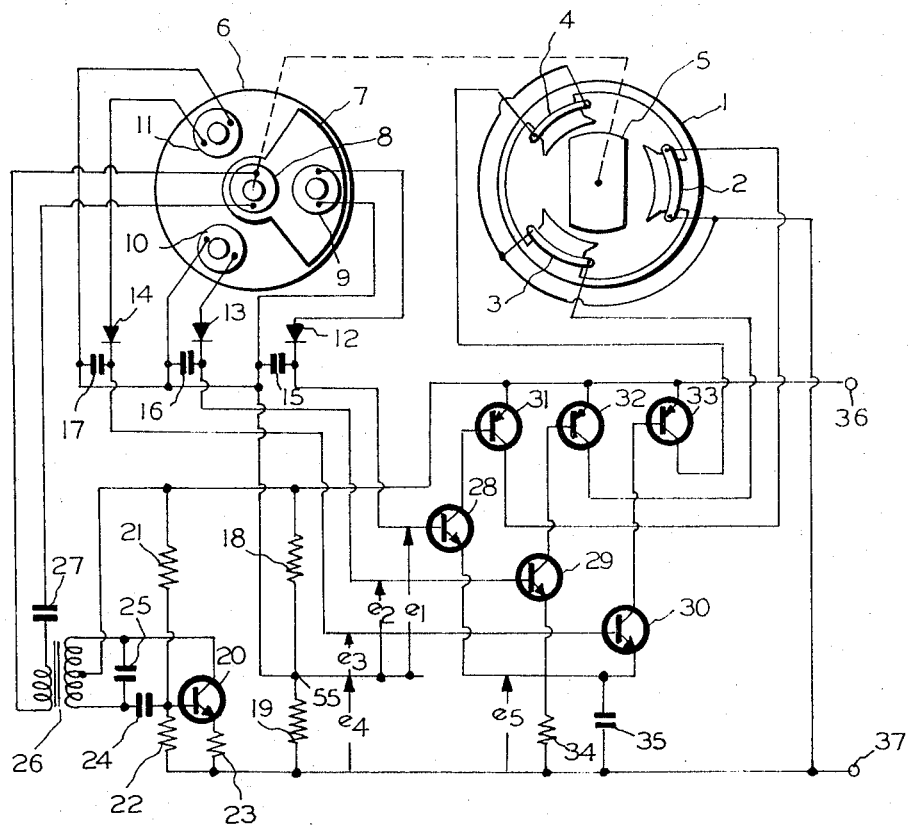
FIG. 1 is a schematic circuit diagram of an electric motor apparatus according to the present invention.

In the embodiment shown in FIG. 1, a stator 1 has three stator windings 2, 3 and 4 wound thereon.

A rotor 5 is rotatably positioned within stator 1. A position detecting means 6 is provided which comprises a position detecting rotor 7 on the shaft of rotor 5, a primary winding 8, and three secondary windings 9, 10 and 11 equidistantly spaced around the means 6. The primary winding 8 is arranged in the center of the position detecting means 6 and always faces the position detecting rotor 7. Each of the secondary windings 9, 10 and 11 faces the position detecting rotor after it has moved 120° from the preceding winding.

A transistor 20, resistors 21, 22 and 23, capacitors 24 and 25, and an oscillator coil 26 are connected in an oscillator circuit which generates a comparatively high frequency (100 Hz.~100 kMz. AC signal.

The output signal of the oscillator circuit is fed to said primary winding 8 through a capacitor 27.

Diodes 12, 13 and 14 are connected forwardly, with respect to current flow from the secondary windings between the one ends of the respective secondary windings and the respective bases of transistors 28, 29 and 30. Each of the other ends of the secondary windings 9, 10 and 11 are connected to one another and connected to a point at which a resistor 18 and a resistor 19 are connected to each other, said point hereinafter being designated as pedestal point 55. Resistors 18 and 19 are connected in series across power supply lines from terminals 36 and 37.

Capacitors 15, 16 and 17 are connected between the bases of the transistors 28, 29 and 30 and the other ends of said secondary windings, respectively.

The emitters of the transistors 28, 29 and 30 are connected to one another. A resistor 34 and a capacitor 35 are connected in parallel between a power supplying terminal 37 and said commonly connected emitters of transistors 28, 29 and 30.

The bases of transistors 31, 32 and 33 are connected to the collectors of transistors 28, 29, and 30, respectively.

The emitters of the transistors 31, 32 and 33 are each connected to the other power supplying terminal 36.

The collectors of the transistors 31, 32 and 33 are connected to one end of said stator windings 2, 3 and 4, respectively and each of the other ends of said stator windings 2, 3 and 4 is connected to the power supplying terminal 37.

Transistors 28, 29 and 30 have a polarity opposite to that of transistors 31, 32 and 33; i.e., if transistors 31, 32 and 33 are PNP type transistors, transistors 28, 29 and 30 are NPN Said oscillator circuit is energized by the current fed from the power supplying terminals 36 and 37.

In operation, the output signal of said oscillator circuit is fed through the capacitor 27 to the primary winding 8. A flux induced in position detecting rotor 7 by the primary winding 8 induces a voltage in the secondary windings 9, 10 and 11 in sequence during rotation of the rotor 7.

Figure 3A:
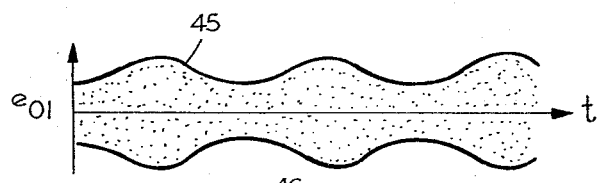
FIGS. 3a–3h are time diagrams for explaining the operation of the motor circuits of FIGS. 1 and 2.
Figure 3B:
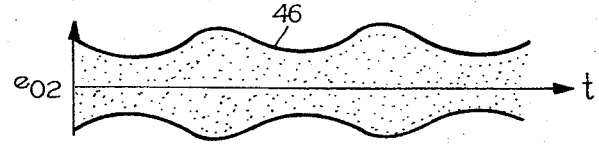
Figure 3C:
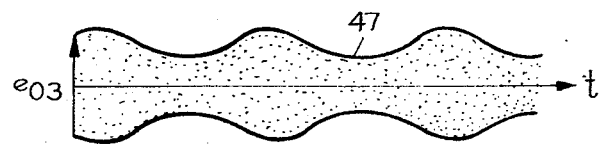

Each of the voltages appearing at the ends of the respective secondary windings has a frequency which is the same as the frequency of the output signal of the oscillator circuit, and has an amplitude varying according to the rotational angle of position detecting rotor 7. It will be understood that the position detecting rotor 7 modulates the amplitude of said voltage. The modulated signal is shown in FIGS. 3a–3c. In FIGS. 3a, 3b and 3c, curves 45, 46 and 47 show the envelopes of the output signal of the respective secondary windings. These curves show that said output signals are not greatly modulated, and the envelopes form a three-phase curve family.

Figure 3D:
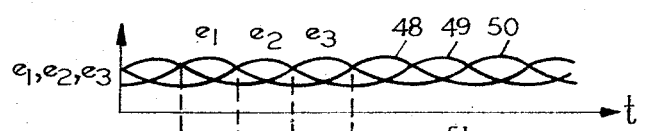

Diodes 12, 13 and 14 rectify said output signals from the secondary windings 9, 10 and 11, and capacitors 15, 16 and 17 filter out the carrier frequency, i.e. the frequency generated by the oscillator circuit. The voltages appearing between the pedestal point 55 and the output side (cathode in this case) of the respective diodes, are designated $e_1$, $e_2$ and $e_3$, and are shown in FIG. 3d as curves 48, 49 and 50. The voltage appearing between the pedestal point 55 and the power supplying terminal 37 is indicated as being $e_4$ in FIG. 1.

The resistors 18 and 19 are given a resistance so that the current flowing through them is comparatively large compared to the base current of transistors 28, 29 and 30. The diodes 12, 13 and 14 have an output impedance which is low compared to the base circuit impedance of said transistors 28, 29 and 30.

The output signal of the secondary windings 9, 10 and 11 are determined by the value of the peak to valley voltage difference of the voltages $e_1$, $e_2$ and $e_3$. When said peak to valley voltage difference is from about 0.5 volt to several volts, the transistors 28, 29 and 30 and resistor 34 act as a triple differential switching circuit.

The voltage $e_5$, appearing between the common emitter circuit of said transistors 28, 29 and 30 and the power supplying terminal 37, corresponds to the greatest voltage of the combined voltages $e_1+e_4$, $e_2+e_4$ and $e_3+e_4$. For example, the position of the position detecting rotor 7 shown in FIG. 1 is such that $e_1+e_4$ is the greatest of the three combined voltages.

The transistor to which the highest base emitter voltage is applied, in this instance transistor 28, feeds its emitter current to the resistor 34 and the voltage $e_5$ is nearly equal to $e_1+e_4-0.6$ volts (when the transistors 28, 29 and 30 are silicon transistors). This state is designated the ON state of the transistor 28. On the other hand, the base emitter-voltages of the transistors 29 and 30 are very low and the base current and the collector current can not flow. This state is designated the OFF state of transistors 29 and 30.

The collector current of transistor 28, which is in the ON state, is supplied to the base of transistor 31, which then is turned to the ON state to supply collector current to the stator winding 2.

The current flowing through the stator winding 2 generates a torque in cooperation with permanent magnetized rotor 5. The rotation of the rotor 5, and consequently the rotation of the position detecting rotor 7, varies the voltages $e_1$, $e_2$ and $e_3$. If it is assumed that the torque generated by the current flowing through the stator windings 2, 3 and 4 and the rotor 5 has a clockwise direction, then when the rotor 5 rotates about 60° from the position shown in FIG. 1, the output signals of the secondary windings 9 and 10 have equal amplitudes and the voltages $e_1$ and $e2$ become equal in value and the emitter current of transistor 28 is decreased and the emitter current of transistor 29 is increased.

Figure 3E:
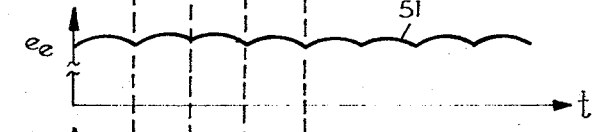

At this point the two transistors 28 and 29 are in the same state, and both of them feed their emitter current to the resistor 34. With further rotation of rotor 5, the emitter current of transistor 28 decreases further and the emitter current of transistor 29 increases further. The sum of the emitter currents of transistors 28 and 29 is determined by the emitter voltage $e_5$ and the resistance value of resistor 34. As the voltage $e_5$ follows to the base potential of transistors 28 and 29, it remains almost constant, as shown in FIG. 3e. When the emitter current of each of transistors 28 and 29 has the same value, which is nearly equal to one-half of the emitter current of a single transistor when it is in the ON state, this state is called the transitional state of transistors 28 and 29.

In the vicinity of the transitional state, the two transistors act as a differential amplifier. But the maximum voltage difference of the two secondary windings 9 and 10, i.e., the maximum difference of the input signal to the differential amplifying transistors 28 and 29, is predetermined so as to be sufficiently large to overcome the differential operation and to drive one of the two transistors into the ON state and the other into the OFF state. Thus the two transistors operate as a differential amplifier only for a very small rotational angle of the rotor 7. Therefore, transistors 28 and 29 switch from an ON to an OFF state and vice versa almost instantaneously.

Figure 3F:
Figure 3G:
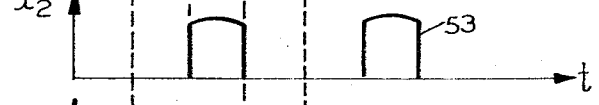
Figure 3H:
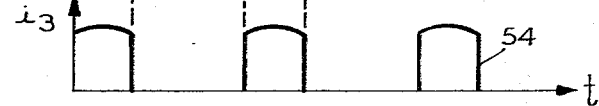

The change of the states of the transistors 29 and 30 and 30 and 28 follow the same pattern as that for the transistors 28 and 29. The ON state of each of the transistors 28, 29 and 30 continues for about 120° of the rotation of the rotor 5. Therefore the rotor 5 generates torque in one direction all during its rotation. The collector currents of the transistors 28, 29 and 30 are shown in FIGS. 3f–3h. Capacitor 35 eliminates undesirable parasitic oscillation.

Figure 2:
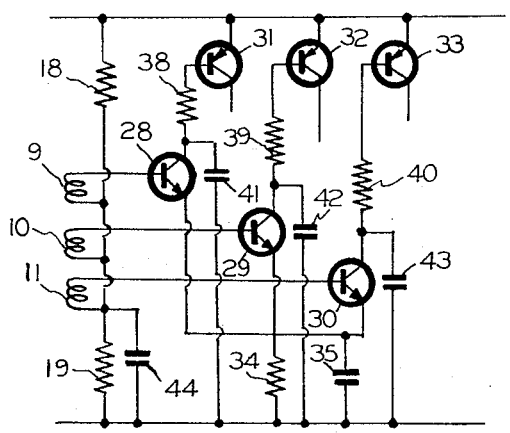
FIG. 2 is a schematic diagram of another electric motor apparatus according to the present invention.

FIG. 2 shows another embodiment which is a variant of the circuit of FIG. 1. Resistors 38, 39 and 40 and capacitors 41, 42, 43 and 44 are employed instead of diodes 12, 13 and 14, and capacitors 15, 16 and 17.

The output signal of the secondary windings 9, 10 and 11 are fed directly to the bases of said transistors 28, 29 and 30. The transistors 28, 29 and 30 operate not only as switching transistors but also as demodulators (or rectifiers). In order to achieve good operation, the capacitance value of the capacitor 35 is made to be such that the time constant obtained by capacitor 35 and resistor 34 is sufficiently large as compared to the frequency of the oscillator circuit.

With this arrangement, the collector currents of transistors 28, 29 and 30, when they are in the ON state, are half-wave rectified currents having the same frequency as said oscillator frequency. Capacitors 41, 42 and 43 filter said rectified current. Resistors 38, 39 and 40 employed for producing better filtering effect. The base currents for transistors 31, 32 and 33 are almost the same as those obtained from the circuit shown in FIG. 1.

The capacitor 44 is employed as a bypass capacitor for the oscillator frequency.

The value of pedestal voltage $e_4$ indicated in FIG. 1 is established so that the ratio of the maximum voltage to the minimum voltage of the emitter voltage $e_5$ is small enough to keep the current flowing through the resistor 34 as constant as possible.

The pedestal voltage $e_4$ can be zero in the case when the voltage family generated by the position detecting means has an equivalent pedestal voltage, which is a comparatively large valley voltage. However, the pedestal voltage proportional to the supply voltage fed to the power supplying terminal 36 and 37 has another purpose. When the supply voltage is increased to a comparatively large value, the base current of each transistor must be increased so as to maintain complete saturation in the ON state. The increase of the pedestal voltage corresponding to the supply voltage enables the increase of the emitter currents of transistors 28, 29 and 30 and the corresponding base current of the transistors 31, 32 and 33. A complete saturation of the transistors 31, 32 and 33 is achieved despite any variation in the supply voltage, and results in a large starting torque and a small power dissipation in the transistors 31, 32 and 33.

The switching system described herein is the fundamental principle of this invention. The position detecting device illustrated and described is one which employs an impedance-type commutator utilizing mutual coupling of two coils. But the switching system is applicable to almost all position detecting devices. A gradually varying commutating signal is converted to a commutating current having no overlap and no dead zones by a polyphase rectification gate circuit. As the motor embodying the present invention has no dead zones and no overlap, even if the temperature varies, and even if the supply voltage to the power supply terminal varies, perfect starting of rotation is guaranteed and very smooth torque is obtained.

The smoothness of the torque causes good transformation of current of torque and high efficiency is obtained.

Moreover, in the manufacture of the motor, no great care of precision in the making of the position detecting means, the position detecting rotor and the current amplification coefficient of the transistors is necessary. This means that the motor is very easy to manufacture.

What we claim is:

1. An electric motor apparatus comprising: stator windings mounted for generating magnetic fields in selected areas; a permanently magnetized rotor moveably mounted adjacent said stator windings for rotation within said magnetic fields; a position detecting means coupled to said rotor for detecting the relative rotational position of said stator windings and said rotor, said position detecting means including voltage generating means for generating a family of voltage having values varying according to said rotational position; a pedestal voltage generating means; a plurality of transistors; an impedance means, said impedance means having two terminals, the emitters of said transistors being connected to one terminal of said impedance means for causing the emitter current of said transistors to flow through said impedance means, said voltage generating means being coupled to the bases of said transistors for supplying the family of voltages generated by said voltage generating means to the bases of said transistors, said pedestal voltage generating means being coupled to said means for generating a family of voltages to bias said family of voltages by said pedestal voltage the means for generating the family of voltages and the pedestal voltage generating means being coupled across the bases of said transistors and the other terminal of said impedance means for applying the total voltage of said voltages in said family of voltages and said pedestal voltage between the bases of said transistors and the other terminal of said impedance means; switching means coupled between the collectors of said transistors and the respective stator windings, the collector currents being utilized for the switching of the current to said stator windings; and a power supply coupled to said stator windings through said switching means and coupled to said impedance means.

2. An electric motor apparatus as claimed in claim 1 in which said pedestal voltage generating means generates a pedestal voltage having a value proportional to the power supplying voltage.

3. An electric motor apparatus as claimed in claim 1 in which said pedestal voltage generating means and said means for generating said family of voltages is a single voltage operating means for producing a family of voltages having a large means value which effectively operates as the pedestal voltage.

4. An electric motor apparatus as claimed in claim 1 in which said position detecting means comprises a primary winding, a plurality of secondary windings around said primary winding, a position detecting rotor to which said primary winding is electrically coupled, said position detecting rotor being mechanically coupled to said magnetized rotor for movement in synchronization therewith, high frequency voltage supply means coupled to said primary winding for supplying a comparatively high frequency alternating current to said primary winding, said secondary windings producing an AC voltage output, and rectifying and filtering means coupled to said secondary windings for obtaining an envelope of the voltage of said AC output of the secondary windings.

5. An electric motor apparatus as claimed in claim 1 in which said impedance means has resistive and capacitive properties, and further comprising filter means coupled to the collectors of said transistors for filtering out the AC current inherent in the collector current of each transistor.